(12) United States Patent
Unbehagen et al.

(10) Patent No.: US 7,894,450 B2
(45) Date of Patent: Feb. 22, 2011

(54) IMPLEMENTATION OF VPNS OVER A LINK STATE PROTOCOL CONTROLLED ETHERNET NETWORK

(75) Inventors: Paul Unbehagen, Apex, NC (US); David Allan, Ottawa (CA); Bruno Germain, Laval (CA); Roger Lapuh, Uesslingen (CH); Mohnish Anumala, Littleton, MA (US); Nigel Bragg, Weston Colville (GB)

(73) Assignee: Nortel Network, Ltd., Mississauga, Ontario (CA)

( * ) Notice: Subject to any disclaimer, the term of this patent is extended or adjusted under 35 U.S.C. 154(b) by 152 days.

(21) Appl. No.: 12/215,350

(22) Filed: Jun. 26, 2008

(65) Prior Publication Data

US 2009/0168666 A1    Jul. 2, 2009

Related U.S. Application Data

(60) Provisional application No. 61/009,717, filed on Dec. 31, 2007.

(51) Int. Cl.
*H04L 12/28* (2006.01)
*H04L 12/56* (2006.01)
(52) U.S. Cl. ............ 370/395.3; 370/254; 370/397
(58) Field of Classification Search ............ 370/395.31, 370/395.3, 351, 254, 216, 225, 420, 401, 370/400, 392, 389; 709/238, 223, 203, 219, 709/249, 230, 239
See application file for complete search history.

(56) References Cited

U.S. PATENT DOCUMENTS 6,693,878 B1 *  2/2004  Daruwalla et al. .......... 370/235

(Continued)

FOREIGN PATENT DOCUMENTS

WO    WO 2008/089305    7/2008

OTHER PUBLICATIONS

International Search Report from corresponding PCT application PCT/US2008/088569.

(Continued)

*Primary Examiner*—Michael J Moore, Jr.
(74) *Attorney, Agent, or Firm*—Anderson Gorecki & Manaras, LLP

(57) ABSTRACT

Nodes on a link state protocol controlled Ethernet network implement a link state routing protocol such as IS-IS. Nodes assign an IP address or I-SID value per VRF and then advertise the IP addresses or I-SID values in IS-IS LSAs. When a packet is to be forwarded on the VPN, the ingress node identifies the VRF for the packet and performs an IP lookup in customer address space in the VRF to determine the next hop and the IP address or I-SID value of the VRF on the egress node. The ingress node prepends an I-SID or IP header to identify the VRFs and then creates a MAC header to allow the packet to be forwarded to the egress node on the link state protocol controlled Ethernet network. When the packet is received at the egress node, the MAC header is stripped from the packet and the appended I-SID or IP header is used to identify the egress VRF. A customer address space IP lookup is then performed in the identified VRF on the egress node using the information in the client IP header to determine how to forward the packet. Customer reachability information within a VPN may be exchanged between VRFs using iBGP, or directly by using link state protocol LSAs tagged with the relevant I-SID.

14 Claims, 5 Drawing Sheets

U.S. PATENT DOCUMENTS

| | | | |
|---|---|---|---|
| 7,596,110 B2 * | 9/2009 | Backman et al. | 370/313 |
| 7,724,732 B2 * | 5/2010 | Guichard et al. | 370/389 |
| 2003/0185233 A1 * | 10/2003 | Ji et al. | 370/466 |
| 2005/0053079 A1 | 3/2005 | Havala | |
| 2005/0190757 A1 | 9/2005 | Sajassi | |
| 2007/0058638 A1 * | 3/2007 | Guichard et al. | 370/395.31 |
| 2007/0091793 A1 | 4/2007 | Filsfils et al. | |
| 2007/0201469 A1 * | 8/2007 | Iyer et al. | 370/391 |
| 2007/0214275 A1 * | 9/2007 | Mirtorabi et al. | 709/230 |
| 2007/0253432 A1 * | 11/2007 | Regale et al. | 370/395.53 |
| 2007/0260746 A1 | 11/2007 | Mirtoraboi et al. | |
| 2008/0232379 A1 * | 9/2008 | Mohamed et al. | 370/395.53 |
| 2008/0267187 A1 * | 10/2008 | Kulmala et al. | 370/392 |
| 2009/0037607 A1 * | 2/2009 | Farinacci et al. | 709/249 |
| 2010/0118740 A1 * | 5/2010 | Takacs et al. | 370/256 |

OTHER PUBLICATIONS

E. Rosen, et al., BGP/MPLS IP Virtual Private Networks (VPNs), IETF RFC 4364, Feb. 2006.

D. Fedyk, et al. "Provider Link State Bridging (PLSB)" IEEE 802.1 working group, Jan. 2007, pp. 2-4, Figs. 1-2.

* cited by examiner

IS-IS

MPLS

IS-IS LSA (TLV)

IMPLEMENTATION OF VPNS OVER A LINK STATE PROTOCOL CONTROLLED ETHERNET NETWORK

CROSS-REFERENCE TO RELATED APPLICATIONS

This application claims priority to U.S. Provisional Patent Application No. 61/009,717, filed Dec. 31, 2007, the content of which is hereby incorporated herein by reference.

TECHNICAL FIELD

The present invention relates to Ethernet networks and, more particularly, to implementation of VPNs over a link state protocol controlled Ethernet network.

BACKGROUND

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units, such as Internet Protocol (IP) packets, Ethernet frames, data cells, segments, or other logical associations of bits/bytes of data, between the network elements by utilizing one or more communication links between the network elements. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how protocol data units should be handled or routed through the network by the network elements, and how information such as routing information should be exchanged between the network elements.

Ethernet is a well known networking protocol that has been defined by the Institute of Electrical and Electronics Engineers (IEEE) as standard 802.3, and as 802.1 for Ethernet bridging functionality. In Ethernet network architectures, devices connected to the network compete for the ability to use shared telecommunications paths at any given time. Where multiple bridges or nodes are used to interconnect network segments, multiple potential paths to the same destination often exist. The benefit of this architecture is that it provides path redundancy between bridges and permits capacity to be added to the network in the form of additional links. However to prevent loops from being formed, a spanning tree was generally used to restrict the manner in which traffic was broadcast or flooded on the network. A characteristic of spanning tree is that there is only one path between any pair of destinations in the network, and therefore it was possible to "learn" the connectivity associated with a given spanning tree by where packets came from. However, the spanning tree itself was restrictive and often led to over-utilization of the links that were on the spanning tree and non-utilization of the links that weren't part of the spanning tree.

To overcome some of the limitations inherent in Ethernet networks, a link state protocol controlled Ethernet network was disclosed in application Ser. No. 11/537,775, filed Oct. 2, 2006, entitled "Provider Link State Bridging," the content of which is hereby incorporated herein by reference. As described in greater detail in that application, rather than utilizing a learned network view at each node by using the Spanning Tree Protocol (STP) algorithm combined with transparent bridging, in a link state protocol controlled Ethernet network the bridges forming the mesh network exchange link state advertisements to enable each node to have a synchronized view of the network topology. This is achieved via the well understood mechanism of a link state routing system. A Provider Link State Bridging network preferably uses "MAC-in-MAC" encapsulation as defined in IEEE 802.1ah, to completely separate the customer (C-MAC) address space from the provider (B-MAC) address space, so that the link state routing system is exposed only to B-MAC addresses which are assigned under provider control. With the use of MAC-in-MAC encapsulation, the bridges in the network have a synchronized view of the network topology, have knowledge of the requisite unicast and multicast connectivity, can compute a shortest path connectivity between any pair of bridges in the network, and individually can populate their forwarding information bases (FIBs) according to the computed view of the network, all in terms of provider-administered B-MAC addresses only.

When all nodes have computed their role in the synchronized view and populated their FIBs, the network will have a loop-free unicast tree to any given bridge from the set of peer bridges (those that require communication to that bridge for whatever reason); and a both congruent and loop-free point-to-multipoint (P2MP) multicast tree from any given bridge to the same set or subset of peer bridges per service instance hosted at the bridge. The result is the path between a given bridge pair is not constrained to transiting the root bridge of a spanning tree and the overall result can better utilize the breadth of connectivity of a mesh. In essence every bridge roots one or more trees which define unicast connectivity to that bridge, and multicast connectivity from that bridge.

When customer traffic enters a provider network, the customer MAC address (C-MAC DA) is resolved to a provider MAC address (B-MAC DA), so that the provider may forward traffic on the provider network using the provider MAC address space. Additionally, the network elements on the provider network are configured to forward traffic based on Virtual LAN ID (VID) so that different frames addressed to the same destination address but having different VIDs may be forwarded over different paths through the network. In operation, a link state protocol controlled Ethernet network may associate one VID range with shortest path forwarding, such that unicast and multicast traffic may be forwarded using a VID from that range, and traffic engineering paths may be created across the network on paths other than the shortest path, and forwarded using a second VID range.

Two examples of link state routing protocols include Open Shortest Path First (OSPF) and Intermediate System to Intermediate System (IS-IS), although other link state routing protocols may be used as well. IS-IS is described, for example, in ISO 10589, and IETF RFC 1195, the content of each of which is hereby incorporated herein by reference.

In addition to installing shortest path unicast forwarding state, the nodes may also install forwarding state for multicast trees on the network. An example of a way to implement multicast in a link state protocol controlled Ethernet network is described in greater detail in U.S. patent application Ser. No. 11/702,263, filed Feb. 5, 2007, entitled "Multicast Implementation in a Link State Protocol Controlled Ethernet Network" the content of which is hereby incorporated herein by reference. As described in that application, link state advertisements may be used to advertise multicast group membership to cause forwarding state for a multicast group to be installed on the network. In particular, each source for a given multicast group may be assigned a destination MAC Address (DA) that is used to forward the frames on the network. The nodes on the network install forwarding state for the source/group tree if they determine that they are on a shortest path from the multicast source to at least one of the destination nodes advertising via the link state protocol an "interest" in the multicast group.

Interest in a multicast may be based on the community of interest identifier such as the I-SID, such that a node on the network will install forwarding state for a multicast group when it is on a shortest path between a source and destination that have both advertised interest in the community of interest identifier associated with the multicast group. An I-SID normally is associated with 802.1ah and implies an additional MAC header (customer source & destination MAC addresses). The utility of the I-SID without the C-MAC header is well understood and is assumed herein. The forwarding state, however, is based on the multicast DA and VID associated with the multicast. In operation, multiple nodes on the network may advertise interest in a particular I-SID. The nodes on the network keep track of which nodes have advertised interest in which I-SID and will install forwarding state for a DA/VID pair associated with the I-SID if they are on the shortest path between two nodes that have advertised interest in the particular I-SID. This allows forwarding state to be installed for communities of interest without requiring flooding of the frames on the network.

Link state protocol controlled Ethernet networks operate at the link layer (Layer 2). That is, the ingress node creates a MAC header that may be used to switch the frame across the Ethernet network, e.g. from Node A to Node E. Other networks, such as Internet Protocol (IP) networks, operate at a higher layer such as Layer 3 (network layer). IP networks forward packets based on an IP address of an IP header associated with an IP packet. In a conventional IP network, an IP lookup is performed at each hop through the network. That is, each node will strip off the outer Ethernet header, read the IP header, and do an IP lookup to route the packet through the network. The node will then add a new Ethernet header to forward the packet to the next node on the network.

FIG. 1 shows how IP forwarding occurs in a multi-protocol label switching (MPLS) network. MPLS networks reduce the number of IP lookups that are required to be performed at the various routers in the network. In an MPLS network, a plurality of Label Switched Paths (LSPs) will be established through the MPLS network. The particular manner in which LSPs are determined and created through the network is well known. In the example shown in FIG. 1 it will be assumed that the label switched path includes nodes A, B, C, D, E. When a packet arrives at the edge router 22A from network X, the edge router 22A will perform an IP lookup to determine which label should be used to switch the IP packet onto the LSP through the MPLS network to reach network Y. The edge router 22A will also determine a next hop for the packet on the path and apply a MAC header to the packet to cause the packet to be forwarded to the next hop on the path (router 22B).

Router 22B will strip the outer MAC header and read the MPLS label. When the LSP was established through the network the label distribution protocol will have established an association between labels on the path, such that for example an association may be formed between label 100 and label 210 for a particular IP Forwarding Equivalence Class. The label association allows the routers to use the label to forward the packet instead of performing an IP lookup. Thus, for example, when the router 22B receives a packet with MPLS label 100, it will replace the label with a new MPLS label 210 and forward the packet to the outbound interface. Before forwarding the packet, router 22B will add a new MAC header to the packet which, in this instance, is SA=J, DA=K to identify the source MAC address as MAC J on router 22B and the destination MAC address as MAC K on router 22C. This process will be repeated at each hop along the label switched path until the packet reaches the label edge router (Node E).

MPLS thus allows a single IP route lookup to be performed at the edge of the MPLS network, and allows label switching to be used instead of IP lookups to forward the packet across the MPLS network. Edge routers that perform the initial IP lookup and assign the label to the packet to place the packet on the LSP are referred to as Label Edge Routers (LERs). Intermediate routers on the MPLS network that perform label switching are commonly referred to as Label Switch Routers (LSRs). Forwarding in an MPLS network is performed by swapping a label after stripping the MAC header at each hop. MPLS forwarding still requires MAC header stripping to occur at every hop across the network (when Ethernet links are employed), requires each LSR to perform a label lookup and label swap, and requires each LSR to then add another MAC header to deliver the packet to the next LSR along the LSP. This process requires processing and intelligence on each of the nodes which thus results in an expensive solution. Additionally, for this to work, the LSP must be initially set up which in and of itself is a computationally expensive process.

A way to enable a link state protocol controlled Ethernet network to implement network layer forwarding was disclosed in U.S. patent application Ser. No. 12/006,258, filed Dec. 31, 2007, entitled "IP Forwarding Across A Link State Protocol Controlled Ethernet Network," the content of which is hereby incorporated herein by reference. Additionally, a way to enable a link state protocol controlled Ethernet network to replace the label switch routers in an MPLS network was disclosed in U.S. patent application Ser. No. 12/006,257, filed Dec. 31, 2007, entitled "MPLS Node Replacement Using A Link State Protocol Controlled Ethernet Network", the content of which is likewise hereby incorporated herein by reference.

Since many customers may share a provider's network, techniques have been developed to allow one customer's data to be segregated from another customer's data. Conventionally, this is implemented using a Virtual Private Network. FIG. 2 shows an example MPLS network in which one or more Virtual Private Networks (VPNs) have been established across the network. A VPN may be established on an MPLS network using the procedures set forth in Internet Engineering Task Force (IETF) Request For Comments (RFC) 4364 for IPv4 VPNs, or RFC 4659 for IPv6 VPNs. Briefly, to establish a VPN on an MPLS network, each of the LERs participating in the VPN will implement a Virtual Routing and Forwarding (VRF) table. The VRF is used to hold routes for the VPN. A routing protocol such as interior Border Gateway Protocol (iBGP) is used within the MPLS network to exchange routing information between the VRFs. When an edge node learns a route from a customer, e.g. via external BGP (e-BGP), the VRF will export the route via iBGP to the other VRFs on the VPN according to the route export policy for the VRF. When a VRF receives a route it will import the route according to its route import policy. VRFs will thus install routing information to be used for forwarding traffic on the VPN.

When a packet is received at the ingress to the MPLS network, the ingress LER will determine the correct VRF to be used to route the packet across the MPLS network and perform an IP lookup in the VRF to determine the next hop for the packet. The ingress LER will obtain a label for the packet and forward the packet onto the LSP through the MPLS network. The ingress LER may also assign an inner label that will allow the correct VRF to be identified at the egress LER. Since IP VPNs are prevalent on MPLS networks, and link state protocol controlled Ethernet networks are able to be integrated to work with or instead of IP or MPLS networks, it would be advantageous to allow IP VPNs to be implemented on a link state protocol controlled Ethernet network.

SUMMARY OF THE INVENTION

Nodes on a link state protocol controlled Ethernet network implement a link state routing protocol such as Intermediate System to Intermediate System (IS-IS). The nodes on the network learn adjacencies from the IS-IS Link State Advertisements (LSAs), also known as Link State Packets, and compute shortest paths between all pairs of nodes on the network. Each participating node populates its Forwarding Information Base (FIB) to construct unicast forwarding state between each pair of nodes on the network. Traffic engineered paths may also be constructed and forwarding state for the TE paths is installed into the nodes FIBs on the network.

IS-IS permits topology information, and the binding of layer 2 and layer 3 addresses to specific network locations and interfaces, to be exchanged independent of the switching or forwarding technology used in specific network elements. Nodes on the link state protocol controlled Ethernet network assign an IP address per VRF and then advertise the IP addresses associated with their VRFs in an IS-IS Link State Advertisement (LSA). A Type Length Value (TLV) may be created to indicate to the nodes that the LSA contains IP addresses of VRFs. When a packet is received, the ingress node to the link state protocol controlled Ethernet network identifies the VRF for the packet and performs an IP lookup in the VRF to determine the next hop and the egress node of the VRF on the network. The ingress node creates an IP header with the source IP address=ingress VRF IP address, and destination IP address=egress VRF IP address. The ingress node also creates a MAC header to place the packet on a path to the egress node on the link state protocol controlled Ethernet network. The nodes on the link state protocol controlled Ethernet network forward the packets to the DA/VID using the forwarding state in their FIBs without performing a MAC stripping operation at each hop. When the packet is received at the egress node, the MAC header is stripped from the packet and the IP header is used to identify the egress VRF. An IP lookup is then performed in the identified VRF on the egress node using the information in the client IP header to determine how to forward the packet. Additional details associated with implementation of IP-VPNs on an Ethernet network is disclosed in U.S. patent application Ser. No. 11/935,563, filed Nov. 6, 2007, entitled "Supporting BGP Based IP-VPN in a Routed Network" the content of which is hereby incorporated herein by reference.

In another embodiment, an I-SID is assigned to each VRF supported by a node on the link state protocol controlled Ethernet network. Each node advertises a set of I-SIDs associated with its VRFs. iBGP is used to exchange routes between the VRFs where iBGP exchange also encodes the I-SID or has a preconfigured I-SID to route target binding so that the VRF can identify which routes are of interest. In one embodiment, the RFC 4364 is used to exchange routes between the VRFs and, according to an embodiment, iBGP is used not only to exchange routes but to also exchange the I-SID values that are used to identify the VRFs. When an ingress node receives a packet it identifies the ingress VRF and performs an IP lookup to determine the next hop for the packet. The ingress node will determine the I-SID associated with the VRF and add an I-SID to the packet to enable the egress node to determine the correct VRF to be used to forward the packet off the network. The ingress node will also create a MAC header to place the packet on a path to the egress node on the link state protocol controlled Ethernet network. The nodes on the link state protocol controlled Ethernet network forward the packets to the DA/VID using the forwarding state in their FIBs without performing a MAC stripping operation at each hop. When the packet is received at the egress node, the MAC header is stripped from the packet and the I-SID is used to identify the egress VRF. An IP lookup is then performed in the identified VRF on the egress node using the information in the client IP header to determine how to forward the packet.

In another embodiment, I-SIDs are assigned to each VRF as in the second embodiment, but iBGP is not used to exchange routes between the VRFs. Rather, route information is exchanged natively between the nodes on the link state protocol controlled Ethernet network by including the route information in Link State Advertisements (LSAs) being exchanged on the network. A new Type Length Value (TLV) may be created to allow the LSA to carry route information on a per-I-SID (per-VRF) basis. The ingress node and egress node use the routing information in the same way as the previous embodiment when forwarding packets across the link state protocol controlled Ethernet network.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1:
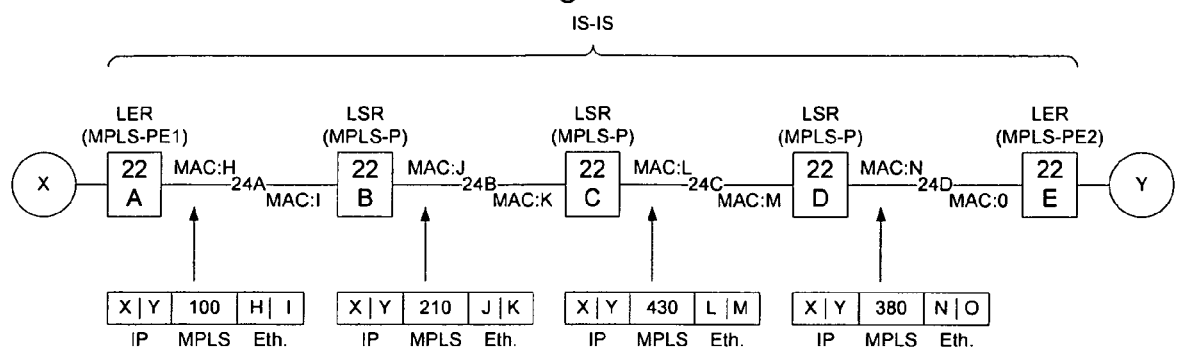
FIG. 1 is a functional block diagram showing how IP forwarding may be implemented in an MPLS network.
Figure 2:
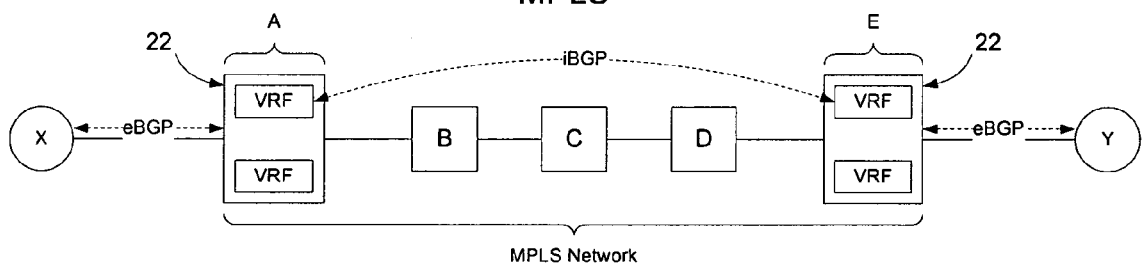
FIG. 2 is a functional block diagram showing the exchange of routing information in an MPLS network.

A link state protocol controlled Ethernet network can be used to implement network layer routing and forwarding by causing the ingress nodes to a switched domain in the network to map network layer addresses to paths through the link state protocol controlled Ethernet network. Although the description will frequently refer to IP addresses as an example network layer address, the disclosure is intended to apply equally to other types of network layer addresses. Thus, the invention is not limited to an implementation that relies on IPv4 or IPv6 for network layer addressing but rather applies equally to other forms of network layer addressing.

Mapping network layer address, such as IP addresses, to paths in the link state protocol controlled Ethernet network allows IP forwarding over the switched network to occur by causing the ingress nodes to the switched network to map the IP addresses to endpoint Ethernet MAC addresses on the link state protocol controlled Ethernet network. When a network layer address is learned at a node on the link state protocol controlled Ethernet network, the node may advertise knowledge of the network layer address. Advertising the network layer addresses allows the ingress node to determine, when an network layer packet is received, which other link state protocol controlled Ethernet network node on the network is able to reach the network layer address.

The ingress node to the link state protocol controlled Ethernet network creates a MAC header that is used to forward the network layer packet to the endpoint MAC address on the network. If the ingress node is node A, and the intended egress node is node E, ingress node A will create a MAC header addressed to a MAC address that is associated with node E. Since the intermediate nodes will have installed shortest path forwarding state to allow them to forward packets addressed to MAC E along the shortest path to that node, the intermediate nodes simply perform a MAC lookup in their Forwarding Information Bases (FIBs) and forward the packet to the correct destination on the network. The intermediate nodes are not required to strip the MAC header off nor to create a new MAC header at each hop along the path. Thus, link state protocol controlled Ethernet network paths may be used to implement network layer forwarding through a link state protocol controlled Ethernet network.

Ethernet switching may be used to implement network layer forwarding in which a single network layer lookup may be performed on an packet as it arrives at a forwarding entity in a switched domain. The network address may be mapped to a MAC header that can be used to transport the packet across the switched domain without requiring further network layer lookup operations as the packet traverses the switched domain. Unlike traditional routed networks, a switched domain allows network layer traffic to be forwarded through multiple Ethernet switches without performing an network layer lookup. Thus, it is able to achieve the functional goal of MPLS of not requiring a network layer lookup on all nodes. However, using a link state protocol controlled Ethernet network to forward network layer traffic has the further advantage over MPLS in that it does not require the MAC header to be stripped off at intermediate nodes nor the swapping of a label added to simulate switching behavior, nor the associated signaling overhead required to manage the binding of the link-local labels. Rather, the same MAC header may be used to switch the packet through multiple network nodes as the packet traverses the nodes on the network.

Figure 3:
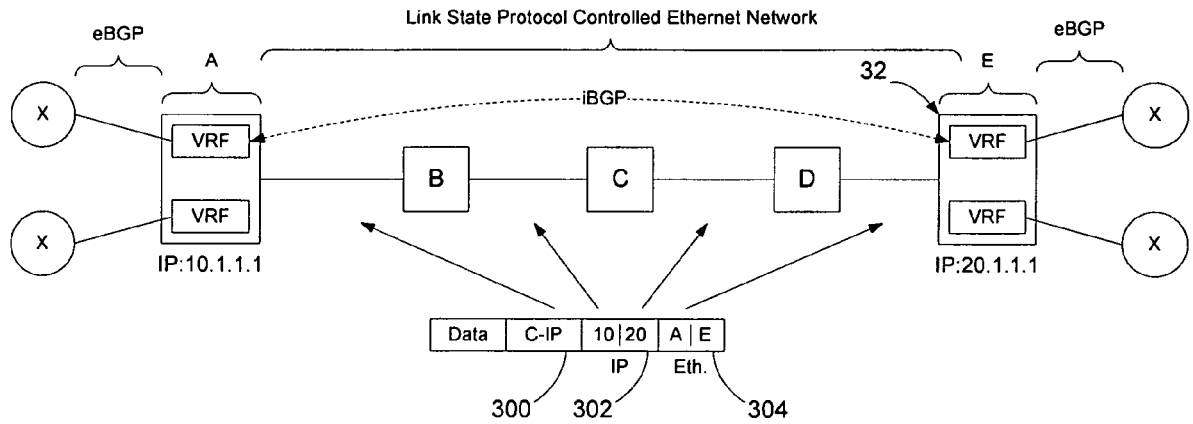
FIG. 3 is a functional block diagram of an example link state protocol controlled Ethernet network configured to implement IP VPNs according to an embodiment of the invention.

FIG. 3 is a functional block diagram showing an example selection of nodes forming a path through a link state protocol controlled Ethernet network and the exchange of routing information to allow the network to implement IP VPNs according to an embodiment of the invention. In the embodiment shown in FIG. 3, as well as FIGS. 5 and 7 discussed below, it will be assumed that nodes A-E are participating in a link state protocol controlled Ethernet network in which each node on the network exchanges Link State Advertisements (LSAs) to learn network topology and install shortest path forwarding state (both multicast and unicast) into their forwarding information bases. The link state protocol controlled Ethernet networks may include numerous other nodes which are not shown in these examples to avoid making the figures too complicated.

In the embodiment shown in FIG. 3, IP VPNs may be implemented on a link state protocol controlled Ethernet network by causing the ingress and egress nodes on the link state protocol controlled Ethernet network to implement a VRF for each supported IP VPN. Specifically, each node that is to support a particular IP VPN will implement a VRF for that IP VPN so that it may maintain routing information for the IP VPN in a secure manner. VRFs are well known entities in the IP VPN field. Client routes may be simply configured into the VRF or discovered via client advertisements using an external routing protocol such as external BGP, which are then stored by the ingress node in a VRF for the IP VPN. VRFs on different nodes on the link state protocol controlled Ethernet network exchange routes in a conventional manner, in this embodiment, using an internal routing protocol such as iBGP.

Figure 4:
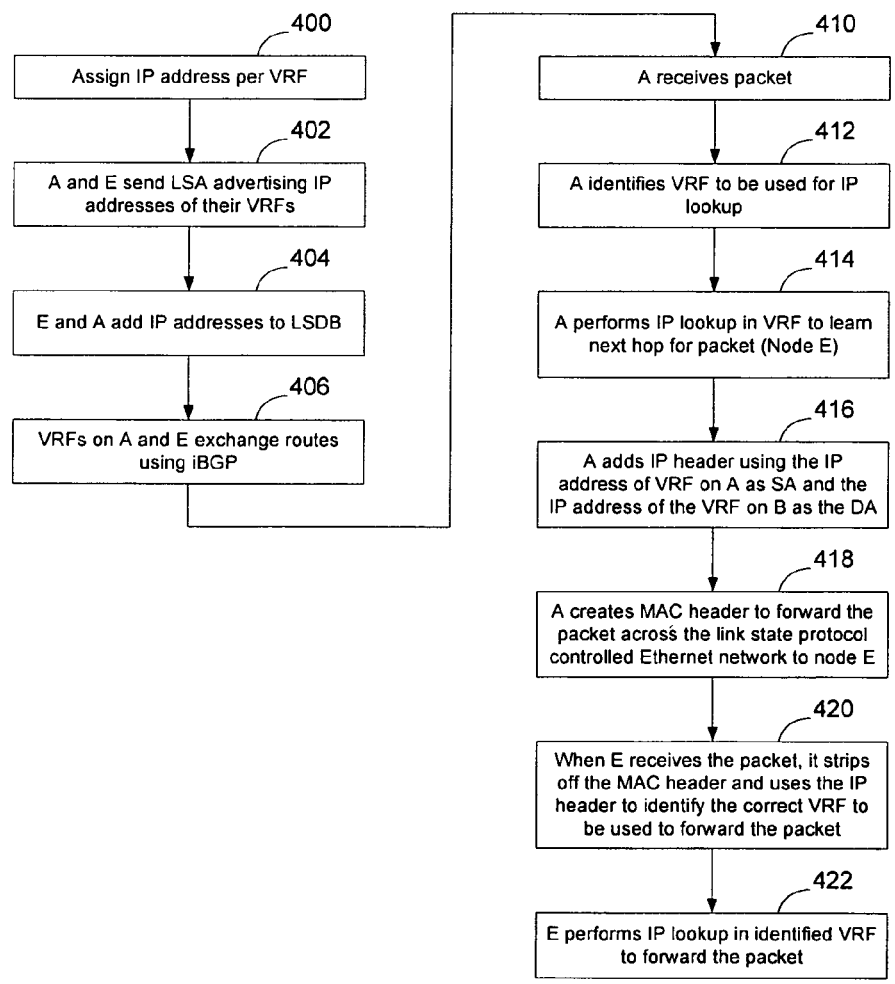
FIG. 4 is a flow chart showing a process that may be implemented to enable IP VPNs to be implemented in the link state protocol controlled Ethernet network of FIG. 3 according to an embodiment of the invention.

FIG. 4 shows one process that may be used to allow the IP VPNs to be implemented on a link state protocol controlled Ethernet network. As shown in FIG. 4, according to an embodiment of the invention, each node on the link state protocol controlled Ethernet network will assign an IP address (from the provider's global IP address space, separate from the customer IP address space used within each IP VPN) to each VRF it supports (400). Nodes on the link state protocol controlled Ethernet network commonly advertise IP addresses that they know and, according to an embodiment of the invention, may also advertise the global IP addresses assigned to their VRFs using this same mechanism (402). Optionally, a unique TLV may be used to specify that the IP addresses carried by the LSA are assigned to VRFs rather than normal IP addresses. When the other nodes receive the LSA containing the IP address associated with or assigned to the VPN, they will add the IP address to their entry for the node in their link state database (404). Thus, all nodes are aware of the provider's global IP addresses associated with the VRFs of all other nodes. Nodes that have VRFs for the same IP VPN exchange routes using iBGP in a normal manner to populate the routing information for the VPN into the VRFs (406).

When an ingress node to the link state protocol controlled Ethernet network (such as Node A in FIG. 3) receives an IP packet on a UNI interface (410), it will identify the VRF to be used to perform an IP lookup to determine how to handle the IP packet (412), which is usually inferred from the physical or virtual port of arrival. After determining the VRF, the ingress node will perform an IP lookup in the VRF to determine the destination for the packet (414). Assuming that the egress node is node E in FIG. 3, the IP lookup in the VRF will return node E as the next hop for the packet.

The ingress node will add an IP header 302, using the IP address of the VRF on the ingress node as the source address, and using the IP address of the VRF on the egress node for that IP VPN as the destination address (416). For example, in the network shown in FIG. 3, the IP header would use the IP address of the VRF on node A as the source address and the IP address of the VRF on node E as the destination address. The IP header will allow the egress node to identify the correct VRF to be used to forward the packet off the link state protocol controlled Ethernet network when the packet is received at the egress node E.

The ingress nodes also creates a MAC header 304 to put the packet on a switched path through the link state protocol controlled Ethernet network (418). As mentioned above, the nodes on the link state protocol controlled Ethernet network will install forwarding state to switch packets along a shortest path to a destination MAC address. The nodes are able to do this by reading the DA and VID of the MAC header and then forwarding the packet without requiring the MAC header to be stripped and replaced at each hop. The packet may thus be forwarded across the link state protocol controlled Ethernet network to arrive at its destination (Node E) in FIG. 3.

When the egress node E receives the packet, it will strip off the outer MAC header 304 and use the outer IP header 302 to identify the correct VRF to be used to forward the packet (420). The egress node will then perform an IP lookup using the inner customer IP header 300 in the identified VRF to forward the packet to the correct destination (422).

Figure 5:
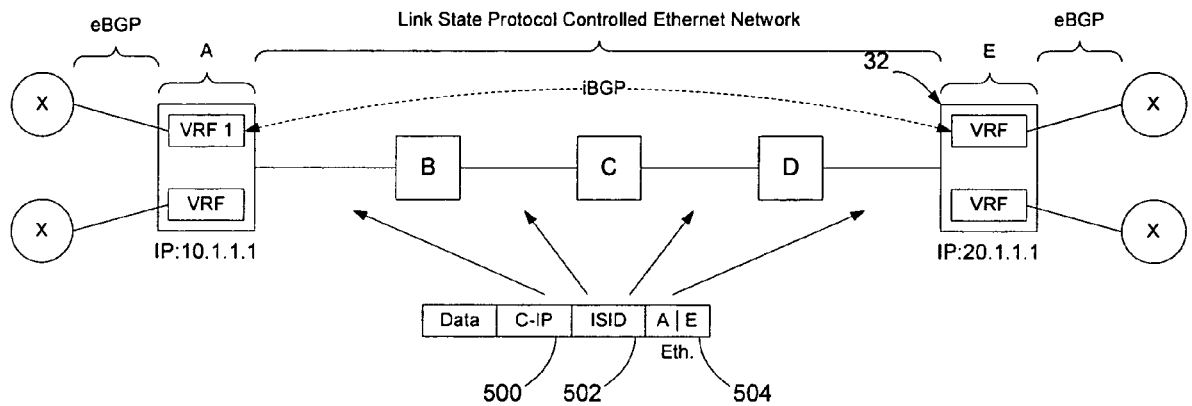
FIG. 5 is a functional block diagram of an example link state protocol controlled Ethernet network configured to implement IP VPNs according to an embodiment of the invention.
Figure 6:
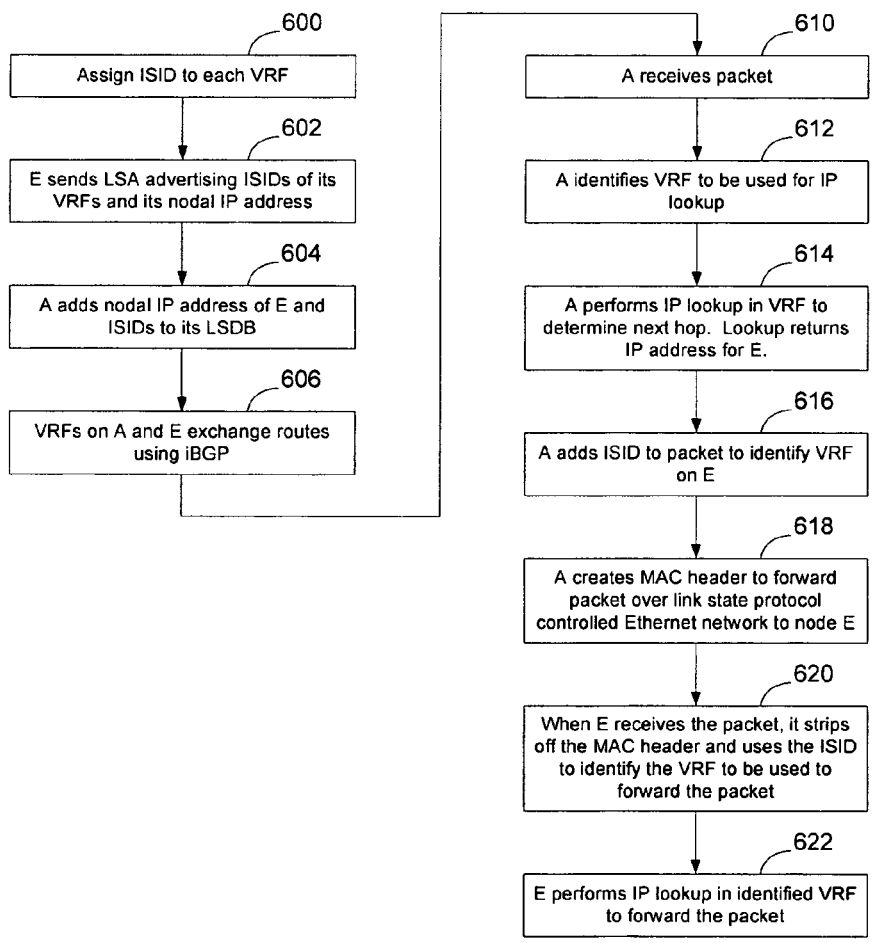
FIG. 6 is a flow chart showing a process that may be implemented to enable IP VPNs to be implemented in the link state protocol controlled Ethernet network of FIG. 5 according to an embodiment of the invention.

FIGS. 5 and 6 show another example of how IP VPNs may be implemented on a link state protocol controlled Ethernet network. As shown in FIGS. 5-6, in this embodiment the edge nodes on the link state protocol controlled Ethernet network assign an I-SID to each VPN locally instantiated as a VRF (600). The edge nodes include the I-SIDs in link state advertisements (LSAs) transmitted in connection with the link state protocol in use on the link state protocol controlled Ethernet network. For example, if IS-IS is being used as the link state protocol, the edge nodes would generate a LSA including the I-SIDs assigned to VPNs supported at that edge node (602). Thus, if E supports a particular VPN, it will assign the I-SID for that VPN to the VRF and generate an LSA that will be transmitted to A. A will add the I-SIDs associated with VRFs supported by node E to its Link State Data Base (LSDB) entry for node E (604). VRF information for the same VPN implemented on the various nodes of the network is exchanged using iBGP in a standard manner (606).

When A receives a packet (610) it will identify the VRF to be used to perform an IP lookup (612) and perform an IP lookup in the VRF to determine the next hop. In this instance, it will be assumed that the lookup returns an IP address reachable via the VRF for this VPN instantiated in E (614). A will add an I-SID 502 to the packet to identify the VPN and ultimately the VRF to be used to forward the packet on E (616), and create a MAC header 504 to put the packet on a path through the link state protocol controlled Ethernet network to E (618). When E receives the packet, it will strip off the outer MAC header 504 and use the I-SID 502 to identify the VRF for that VPN to be used to forward the packet (620). E will perform an IP lookup using the customer IP header 500 in the identified VRF to forward the packet (622) to the correct customer facing interface.

Figure 7:
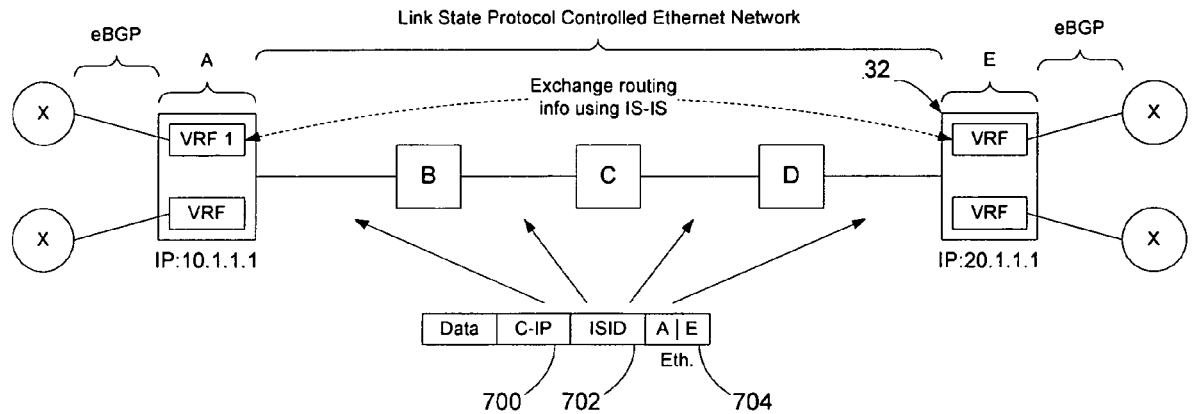
FIG. 7 is a functional block diagram of an example link state protocol controlled Ethernet network configured to implement IP VPNs according to an embodiment of the invention.
Figure 8:
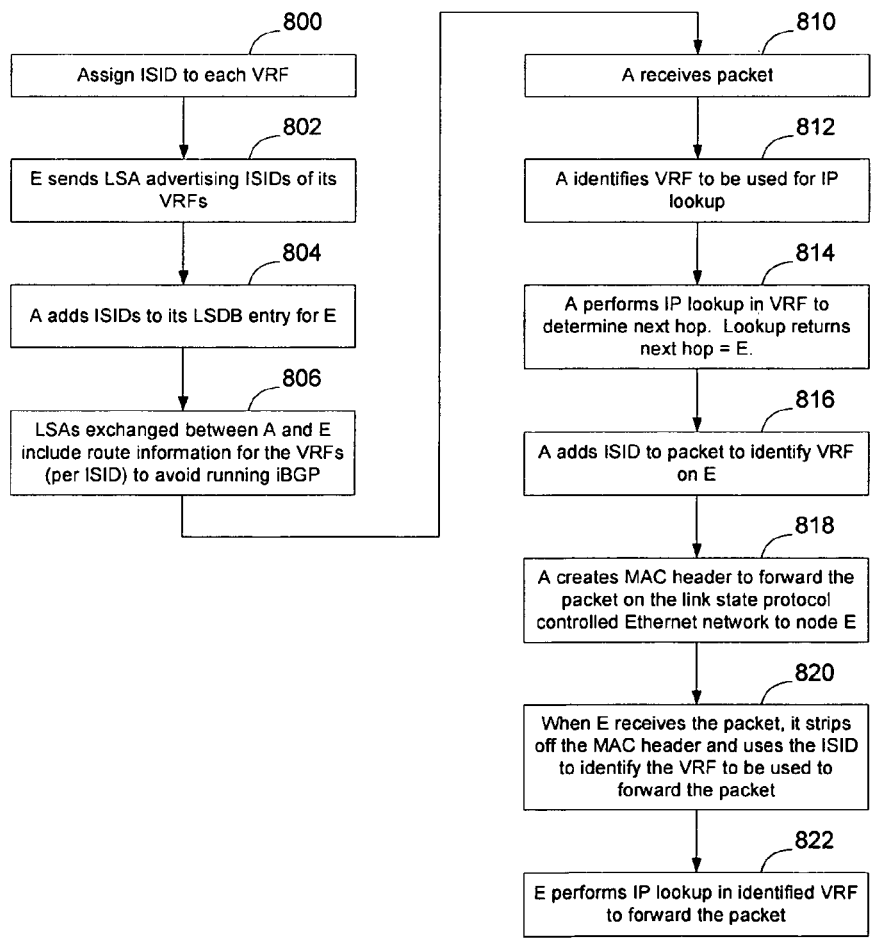
FIG. 8 is a flow chart showing a process that may be implemented to enable IP VPNs to be implemented in the link state protocol controlled Ethernet network of FIG. 7 according to an embodiment of the invention.

FIGS. 7-8 show another embodiment of the invention in which I-SID tagged customer routing information is exchanged in the IS-IS protocol used for the link state protocol controlled Ethernet network. Thus, this embodiment operates similarly to the embodiment shown in FIGS. 5-6, except that in this embodiment the link state routing protocol is used to exchange routing information between the VRFs rather than requiring an interior gateway routing protocol such as iBGP to be used to exchange the routes.

Specifically, as shown in FIGS. 7-8, the edge nodes will bind an I-SID identifying the VPN to each VRF supported by the edge node (800) and advertise the I-SIDs on the link state protocol controlled Ethernet network in LSAs (802). When a node receives a LSA containing an I-SID, it will add the I-SID to its LSDB entry for the node that issued the LSA (804). When a node learns a new route associated with an I-SID, it will populate the route into the correct VRF and also generate an LSA containing the route. A new Type Length Value (TLV) may be used to carry routing information between VRFs as discussed below in connection with FIG. 9. Thus, the LSAs exchanged between the end nodes include route information for the VRFs (route information per I-SID) so that the edge nodes may avoid running iBGP (806).

When an edge node such as node A receives a packet (810) it will identify the VRF to be used to perform an IP lookup on the packet (812). The edge node will then perform an IP lookup in the VRF to determine the next hop for the packet. In this example, it will be assumed that the next hop for the packet is egress node E (814).

The ingress node (node A) will add an I-SID 702 to the packet to identify the VRF on E for the VPN that should be used to handle the packet (816). A will also create a MAC header 704 to put the packet on a switched path through the link state protocol controlled Ethernet network to the egress node (node E) (818).

When the egress node receives the packet, it will strip off the outer MAC header 704 and use the I-SID 702 to identify the VRF that is to be used to forward the packet (820). The egress node will then perform an IP lookup using the customer IP header 700 in the identified VRF to forward the packet off the link state protocol controlled Ethernet network to the correct customer facing interface.

As mentioned above in connection with FIGS. 7-8, it may be necessary to define a new Type Length Value (TLV) to allow the IS-IS Link State Advertisements (LSAs) to carry route information per I-SID. The TLV specifies the format of the LSA, to allow the nodes on the network to interpret the fields of the LSA in the correct manner. Essentially, the TLV specifies the format of the LSA and specifies the types of information that may be conveyed in the LSA. The format of IS-IS TLVs is defined by ISO10589. This standard provides that the first octet of a TLV encodes the type or "codepoint" which provides a scope for the information and information format.

Figure 9:
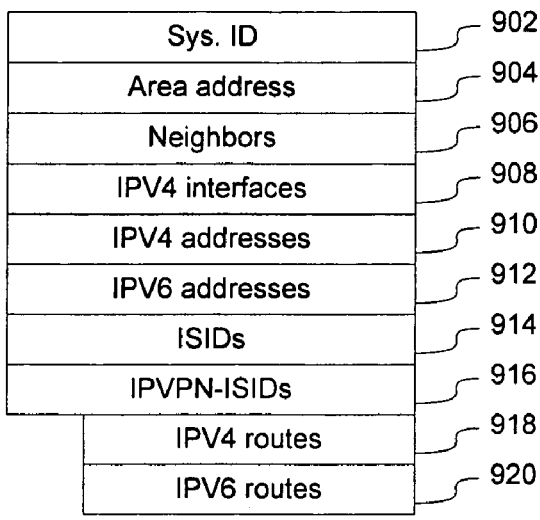
FIG. 9 is a functional block diagram of one example of how a Link State Advertisement (LSA) may construct a Type Length Value (TLV) that will allow the LSA to carry routing information between VRFs associated with an IP VPN according to an embodiment of the invention.

FIG. 9 illustrates one possible ISIS LSA (TLV) that may be used to allow the IS-IS LSA to convey routing information between VRFs on a per-I-SID basis. It has been assumed that the first octet of the LSA TLV would specify a value that will allow the systems on the link state protocol controlled Ethernet network to understand the format of the fields contained in the LSA TLV.

In the example TLV shown in FIG. 9, the TLV 900 includes several fields which are standard fields in conventional TLVs. For example, the TLV may include a System ID field 902, an Area address field 904, and information on the neighbors 906 of the node issuing the LSA. The TLV also includes a field for the node to specify its IPv4 interfaces 908, and to identify the IPv4 addresses 908 and IPv6 addresses 910 of which it is aware. The TLV may also include the I-SIDs of which it is aware 914.

According to an embodiment of the invention, a TLV may also include a field that will allow the node to specify I-SIDs that may be used for IP VPNs (916) that have been assigned to VRFs instantiated on that node. As mentioned above, allowing the nodes to assign I-SIDs to VRFs allows the nodes to include an I-SID header on packets as the packets are transmitted across the link state protocol controlled Ethernet network so that the correct VRF to be used to forward the packet off the network by the egress node may be determined. Thus, the TLV allows the nodes to advertise knowledge of particular VRFs by advertising knowledge of the IP VPN-I-SIDs assigned to those VRFs. The IP VPN-I-SID field 916 would be used to advertise the VRFs in the embodiment shown in FIGS. 5-6, as well as the embodiment shown in FIGS. 7-8.

The TLV 900 also includes two additional sub-fields that allow the LSA to contain IPv4 routes 918 and IPv6 routes 920. These two sub-fields are included per-IP VPN-I-SID so that the IPv4 and IPv6 routes may be specified on a per-IP VPN-I-SID basis. This allows routing information to be exchanged between VRFs using the native LSAs implemented in the link state routing system rather than requiring a separate routing protocol instance such as iBGP to be run between the VRFs. The VRFs may apply standard VRF route export policy when exporting routes and may also apply standard VRF import policy when deciding whether to import the routing information into their VRFs. Other TLV formats may be used as well and the illustrated embodiment is meant to provide an example of how the LSA may be formatted to carry the information associated with the IP VPNs.

Figure 10:
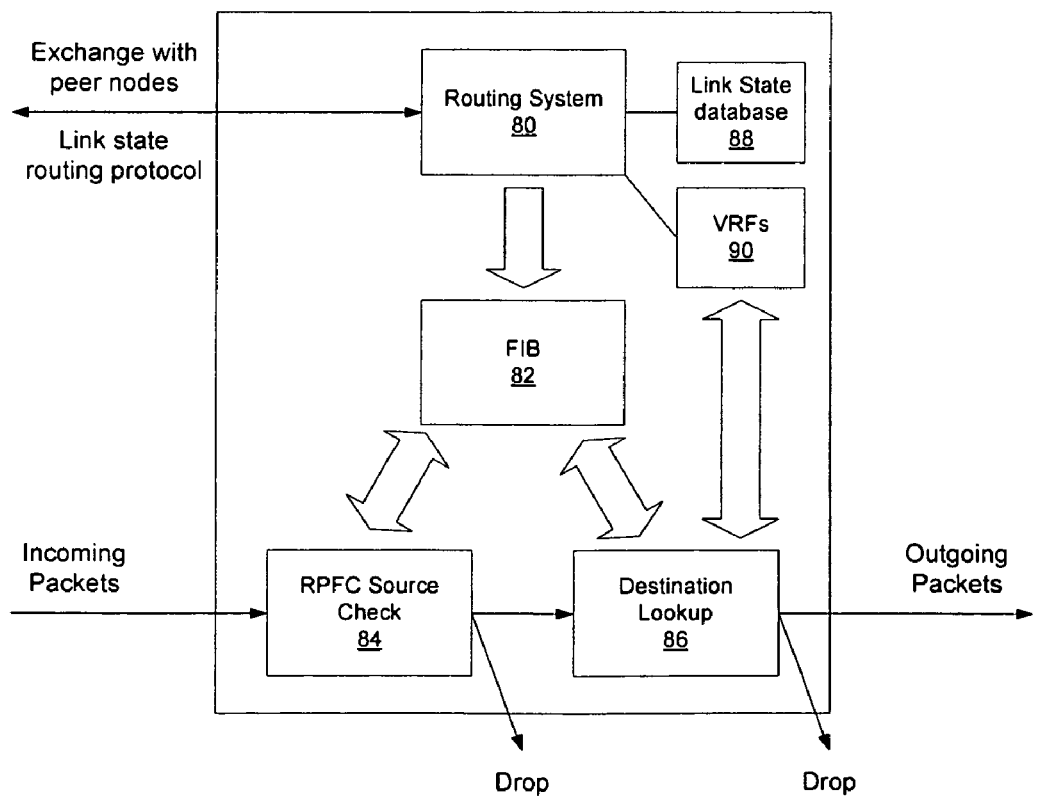
FIG. 10 is a schematic representation of a possible implementation of a network element configured to be used in a link state protocol controlled Ethernet network according to an embodiment of the invention.

FIG. 10 is a schematic representation of a possible implementation of a network element such as network elements A-E in FIGS. 3, 5, and 7, which is configured to be used in a link state protocol controlled Ethernet network. The network element includes a routing system module 80 configured to exchange control messages containing routing and other information with peers in the link state protocol controlled Ethernet network regarding the network topology using a link state routing protocol. Information received by the routing system 80 may be stored in a link state database 88 or in another manner. As discussed previously, the exchange of information allows nodes on the network to generate a synchronized view of the network topology, which then allows the routing system module 80 to calculate the shortest paths to other nodes on the network. The shortest paths calculated by the routing system 80 will be programmed into a FIB 82, that is populated with the appropriate entries for directing traffic through the network based upon the calculated shortest paths, multicast trees, traffic engineered path entries, and based on other entries.

According to an embodiment of the invention, the routing system 80 may exchange route updates containing network layer reachability information. The network layer addresses known by nodes on the network will be stored in a link state database 88 on the network element to allow ingress nodes to select the correct egress node on the link state protocol controlled Ethernet network when an network layer packet arrives. Knowledge of the network layer addressees may also allow multicast forwarding state to be implemented on the network to allow network layer multicast to be handled by the nodes on the network by causing the nodes to install forwarding state between pairs of nodes interested in the same IP multicast groups.

The network element, according to an embodiment of the invention, also includes VRFs 90 configured to contain routing information for VPNs to be implemented on the link state protocol controlled Ethernet network. The VRFs may be implemented separately as shown or may be implemented as a designated portion of the FIB 82.

When a frame is received, if the DA of the packet indicates that the packet is addressed to the node, the node will strip the outer MAC header off the packet and look at the inner I-SID or IP header to determine the VRF to be used to perform an IP lookup for the packet. The node will then access the correct VRF, perform an IP lookup based on the customer IP header, and forward the packet toward the destination address of the customer IP header.

It should also be understood that the modules described are for illustrative purposes only and may be implemented by combining or distributing functions among the modules of a node as would be understood by a person of skill in the art.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of implementing a layer 3 Virtual Private Network (VPN) over an underlying Ethernet network, the Ethernet network implementing a link state protocol in a network control plane to enable each Ethernet node to have a synchronized view of a topology of the Ethernet network and to individually populate a forwarding information base according to a computed view of the network, the method comprising the steps of:

assigning a VPN I-SID to the VPN, the VPN I-SID being a community of interest identifier with relevance to the network control plane for selective installation of forwarding state in the Ethernet node forwarding information bases, but not used to forward traffic on the Ethernet network;

establishing a first Virtual Routing and Forwarding table (VRF) for the VPN on a first node in the link state protocol controlled Ethernet network, assigning the VPN I-SID to the first VRF;

advertising the VPN I-SID in a first link state protocol link state advertisement by the first node;

establishing a second VRF for the VPN on a second node in the link state protocol controlled Ethernet network;

assigning the VPN I-SID to the second VRF;

advertising the second attachment of the I-SID in a link state protocol link state advertisement by the second node; and using the VPN I-SID when transmitting packets of data on the link state protocol controlled Ethernet network to allow a node that receives the packets to identify the correct VRF to be used for further handling of the packets.

2. The method of claim 1, further comprising the steps of:
establishing a plurality of additional VRFs for the VPN on other nodes in the link state protocol controlled Ethernet network;
assigning the VPN I-SID to the other VRFs; and
advertising the attachment of the I-SID to the other VRFs in link state protocol link state advertisements by the other nodes.

3. The method of claim 1, wherein iBGP is used to exchange customer routes tagged with the identifying I-SID between the VRFs.

4. The method of claim 3, wherein the I-SIDs identifying the VRFs are also exchanged via iBGP.

5. The method of claim 1, wherein link state protocol advertisements are used to exchange customer routes tagged with the identifying I-SID between the VRFs.

6. The method of claim 5, wherein the link state protocol advertisements are used to also exchange routing information of the link state protocol controlled Ethernet network.

7. The method of claim 6, wherein the link state protocol is Intermediate-System to Intermediate-System (IS-IS) and the link state protocol advertisements have a Type Length Value (TLV) to specify to the nodes on the link state protocol controlled Ethernet network that the IS-IS link state advertisement carries customer routes associated with a VPN.

8. The method of claim 7, wherein the TLV enables IPv4 as well as IPv6 customer routes to be carried in the IS-IS link state protocol advertisement.

9. A method of implementing an Internet Protocol (IP) Virtual Private Network (VPN) over a link state protocol controlled Ethernet network, the method comprising the steps of:
establishing a first Virtual Routing and Forwarding table (VRF) for the IP VPN on a first node in the link state protocol controlled Ethernet network,
advertising a first global IP address assigned to the first VRF and a MAC address of the first node in a link state advertisement in the link state protocol controlled Ethernet network, the first global IP address identifying the first VRF on the first node;
establishing forwarding state to the MAC address in intermediate nodes of the link state protocol controlled Ethernet network; and
when a second node on the link state protocol controlled Ethernet network has an IP packet including a first IP header and being associated with the VPN that is to be transmitted to the first node on the link state protocol controlled Ethernet network, prepending a second IP header to the packet by the second node, the second IP header including as a destination IP address the global IP address assigned to the first VRF, and then prepending a third header to the packet by the second node, the third header including the MAC address of the first node, and forwarding the packet with the second and third headers onto the link state protocol controlled Ethernet network.

10. The method of claim 9, wherein the intermediate nodes on the link state protocol controlled Ethernet network forward the IP packet using the MAC address of the third header according to the installed forwarding state for that MAC address in the nodes of the link state protocol controlled Ethernet network.

11. The method of claim 10, wherein when the first node receives the packet, it reads the third header to learn that the destination address of the MAC header matches its own MAC address, and then reads the IP address of the second header to identify the first VRF.

12. The method of claim 11, wherein the first IP header is a client IP header containing routing information that may be used in connection with routing information in the first VRF to determine a customer facing interface for the IP packet.

13. The method of claim 9, wherein iBGP is used to exchange customer routes between the first VRF and other VRFs associated with the VPN that have been instantiated on other nodes in the link state protocol controlled Ethernet network.

14. The method of claim 9, wherein link state protocol advertisements are used to exchange customer routes between the first VRF and other VRFs associated with the VPN that have been instantiated on other nodes in the link state protocol controlled Ethernet network.

* * * * *